United States Patent [19]
Kim

[11] Patent Number: 5,993,920
[45] Date of Patent: Nov. 30, 1999

[54] INCOMBUSTIBLE ARTIFICIAL MARBLE AND A PROCESS FOR PREPARATION THEREOF

[76] Inventor: Kyung Sun Kim, No. 1107, 1-Dong, Daerim Apt. 277, Nokbeon-dong, Eunpyeong-ku, Seoul, Rep. of Korea

[21] Appl. No.: 09/049,945

[22] Filed: Mar. 30, 1998

[30] Foreign Application Priority Data

Feb. 5, 1998 [KR] Rep. of Korea .......................... 98-3176

[51] Int. Cl.$^6$ ....................................................... B32B 7/06
[52] U.S. Cl. .............................. 428/15; 428/40.1; 156/250
[58] Field of Search ...................... 428/40.1, 15; 156/250

[56] References Cited

FOREIGN PATENT DOCUMENTS 244  4/1973  Rep. of Korea .

*Primary Examiner*—Alexander Thomas

[57] ABSTRACT

An incombustible artificial marble which is used to produce multiple color patterns which contains, as a multiple layer composite, a layer of activated clay mixed with stone powder and/or cement powder, fine sawdust and/or the heart of kaoliang stalk, a coloring agent, calcium and magnesium salts, an epoxy resin layer; an adhesive layer; a transfer film layer containing multiple color patterns, an ultra-violet curable adhesive layer and a protective film layer.

12 Claims, 1 Drawing Sheet

INCOMBUSTIBLE ARTIFICIAL MARBLE AND A PROCESS FOR PREPARATION THEREOF

BACKGROUND OF THE INVENTION

The present invention relates to a process for preparing incombustible artificial marble for architectural and floor use and also to a method of preparing incombustible artificial marble.

Processes for preparing artificial marble by mixing stone powder, cement, etc. with an adhesive or water are well known.

However, in the case of the artificial marble mentioned above, they frequently are broken or cracked by slight contact or pressure because the bending strength (moment) and the general strength thereof are low.

Furthermore, since conventional artificial marble cannot have a flat and slick surface due to the properties of the various components such as stone powder, cement, sand, etc., multiple color patterns cannot be distinctly and selectively transferred thereto by hot stamping or roller coating, except for black or white color.

In addition, in order to prepare color patterns, small color marble aggregates are mixed with raw materials of said artificial marble to show color patterns on the surface of the marble.

However, such marble cannot have multiple color patterns except for one or more colors since the colors of the aggregate are restricted.

DESCRIPTION OF THE PRIOR ART

Conventional artificial marble for architectural and floor use are weak when exposed to slight contact, heat or pressure and cannot exhibit selective multiple surface color patterns.

Examples of artificial marble for the architectural and floor use are described in Korean Patent Publication Nos. 74-305 and 95-8049. The former is a process for preparing artificial marble formed in three-dimensional color patterns comprising a first step of layering various mineral color powders in optional designs on a transparent synthetic resin thin layer so that a part of the resulting color patterns layer penetrates a thin layer of synthetic resin. A second step comprises layering a composition of artificial marble consisting of two or more components including a thermosetting synthetic resin to form color patterns by differences in curing speed and fluidity on said thin layer of synthetic resin to be cured together with said thin layer.

However, since the artificial marble includes a synthetic resin, it does not have fire-resistance and incombustibility. Also its three-dimensional color patterns cannot repeatedly expose the same patterns and thus desired patterns cannot be obtained.

The latter is a process for preparing an artificial marble by treating the surface with glass particles coated with bioceramic powder and organic dyestuffs. However, in such artificial marble, the same multiple color patterns cannot be selectively and optimally repeated, such as those shown by transferring certain multiple designs and colors.

SUMMARY OF THE INVENTION

It is an object of the present invention to provide an incombustible marble for architectural and floor use having selective multiple color patterns.

More particularly, the present invention relates to artificial marble which is molded by mixing activated clay with fine stone powder and/or cement powder, a small amount of fine sawdust and/or powder of the heart of kaoliang stalk, a coloring agent, and bittern containing calcium sulfate, calcium silicate, magnesium, magnesium chloride, etc., or a composition of components identical to said bittern.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
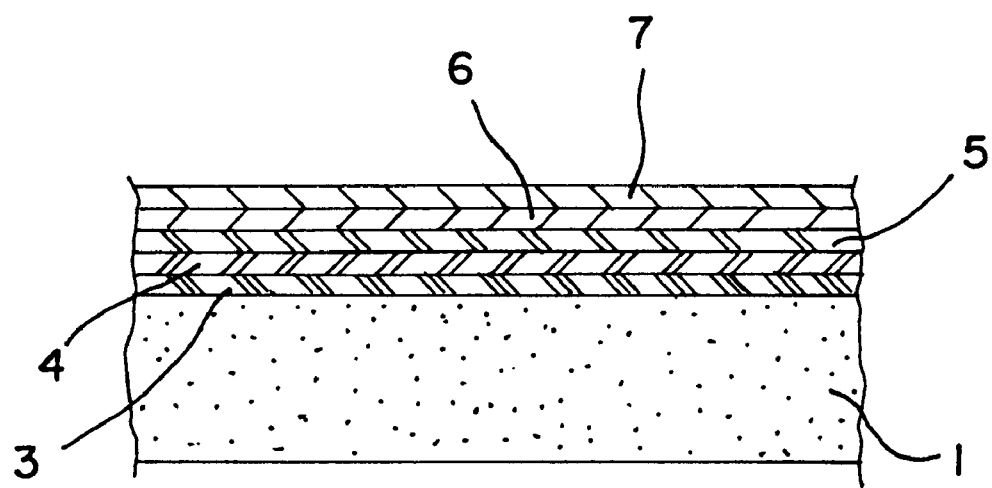
FIG. 1 is a cross-sectional view of artificial marble made in accordance with the present invention.

FIG. 1 shows a cross-sectional view of the artificial marble of the present invention.

A process for preparing the artificial marble of the present invention will now be described in detail.

Activated clay is mixed with fine stone powder and/or cement powder, a small amount of fine sawdust and/or powder of the heart of kaoliang stalk, a small amount of coloring agent and bittern obtained by the water absorption of crude sodium chloride containing calcium sulfate, calcium silicate, magnesium and magnesium chloride, etc., or a composition of components identical to said bittern to produce a paste phase mixture 1. The past phase mixture 1 is then applied to a molding plate selected from glass, acryl, polycarbonate, polyvinyl chloride or polypropylene plates passing through continuously and the materials of said molding plates, in situ, are passed through between mixture-separative sandwich rollers to give a certain thickness of a mixture sheet by pressing. The sheet is then dried at ambient temperature, in the summer by hot air and in a drying furnace at a temperature of 40–50° C. for about 10 hours, in the winter. The surface of the dried sheet is ground by sand paper. On the ground surface an epoxy resin layer 3 is evenly coated followed by an adhesive layer 4, multiple color patterns of transfer film layer 5, an ultraviolet curable adhesive layer 6 and a protection film layer 7 which adhere together. The resulting products are cut to a desired size to give a light, hard, bendable, incombustible artificial marble for architectural and floor use.

The present artificial marble in accordance with the present invention, as described above, has excellent hardness, is light in weight, incombustible and does not break down since the activated clay for forming the artificial marble contains mineral oxides such as silicon oxide ($SiO_2$), aluminum oxide ($Al_2O_3$), magnesium oxide (MgO), calcium oxide (CaO) sodium oxide ($Na_2O$), ETC.

Bittern, which is present in the marble, and is composed of a mineral or mineral salt such as calcium sulfate, calcium silicate, magnesium and/or magnesium chloride, ix easily mixed with the activated clay to provide an excellent coherence and coagulating force.

Furthermore, since the surface of the mixture sheet is ground, is coated with a flat epoxy resin layer 3 and is transferred by the adhesive layer 4, the surface of the resulting products is firm and flat and thus the surface of the end products, i.e., the marble, appears by the transference to have minute and multiple color patterns similar to natural color.

In addition, by providing an ultraviolet curable adhesive layer 6 to protect the surface of the marble, said transfer film layer 4 is not oxidized to a different color and also due to the use of a protective film layer 7, distinct surface color patterns of the marble are always maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Incombustible artificial marble used to produce multiple color patterns for architectural purposes and floor covering which comprises, as a composite,
    a layer of activated clay mixed with stone powder, fine sawdust, a coloring agent and calcium and magnesium salts,
    an epoxy resin layer,
    an adhesive layer,
    a transfer film layer containing multiple color patterns,
    an ultra-violet-curable adhesive layer, and
    a protective film layer.

2. The artificial marble of claim 1, wherein the stone powder is replaced with cement powder or a mixture of stone powder and cement powder.

3. The artificial marble of claim 1, wherein the sawdust is replaced with powder of the heart of kaoliang stalk or a mixture of sawdust and heart of kaoliang stalk.

4. The artificial marble of claim 1, wherein the activated clay contains at least one oxide selected from the group consisting of silicon oxide, aluminum oxide, magnesium oxide, calcium oxide and sodium oxide.

5. The artificial marble of claim 1, wherein the calcium and magnesium salts are obtained from bittern.

6. A process for preparing an incombustible artificial marble which comprises
    mixing activated clay with fine stone powder, sawdust, a coloring agent and calcium and magnesium salts to form a paste,
    applying said paste to molding plates and passing said paste-plates composite through rollers to form a sheet,
    drying the sheet,
    grinding the surface of the dried sheet,
    coating an epoxy resin layer on the ground sheet,
    coating an adhesive layer on the epoxy resin layer,
    applying a multiple color pattern transfer film layer on the adhesive layer,
    applying an ultra-violet curable adhesive layer to the transfer film layers,
    adding a protective film layer to the curable adhesive layer, and
    cutting the composite, layered structure into a desired size to produce a light, hard, bendable, incombustible artificial marble which is usable for architectural purposes and floor covering.

7. The process of claim 6, wherein the stone powder is replaced with cement powder or a mixture of stone powder and cement powder.

8. The process of claim 6, wherein the sawdust is replaced with powder of the heart of kaoliang or a mixture of sawdust and powder of the heart of kaoliang.

9. The process of claim 6, wherein the molding plates are selected from the group consisting of glass plates, acryl plates, polycarbonate plates, polyvinyl chloride plates and polypropylene plates.

10. The process of claim 6, wherein the sheet is dried, in the summer, at ambient temperature.

11. The process of claim 6, wherein the sheet is dried, in the winter, by hot air in a drying furnace maintained at a temperature of 40 to 50° C. for about 10 hours.

12. The process of claim 6, wherein the calcium and magnesium salts are obtained from bittern.

* * * * *